(12) United States Patent
Horiuchi et al.

(10) Patent No.: US 12,555,480 B2
(45) Date of Patent: Feb. 17, 2026

(54) INFORMATION PROCESSING APPARATUS, MOVING OBJECT, SYSTEM, INFORMATION PROCESSING METHOD, AND COMPUTER-READABLE STORAGE MEDIUM TO IDENTIFY A RISK AREA

(71) Applicant: HONDA MOTOR CO., LTD., Tokyo (JP)

(72) Inventors: Moriya Horiuchi, Saitama (JP);
Takahiro Kurehashi, Saitama (JP);
Yuta Sakagawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 402 days.

(21) Appl. No.: 18/145,859

(22) Filed: Dec. 23, 2022

(65) Prior Publication Data
US 2023/0237910 A1  Jul. 27, 2023

(30) Foreign Application Priority Data

Jan. 24, 2022  (JP) .................................. 2022-008639

(51) Int. Cl.
*G05D 1/00* (2024.01)
*G08G 1/052* (2006.01)
*G08G 1/16* (2006.01)

(52) U.S. Cl.
CPC ............. *G08G 1/164* (2013.01); *G08G 1/052* (2013.01); *G08G 1/166* (2013.01)

(58) Field of Classification Search
CPC ........ G08G 1/164; G08G 1/052; G08G 1/166; G08G 1/0141; G08G 1/096716; G08G 1/0112; G08G 1/096775; G08G 1/091; H04W 4/021; H04W 4/06; H04W 4/44; H04W 4/90
(Continued)

(56) References Cited

U.S. PATENT DOCUMENTS

2018/0239359 A1*  8/2018  Jian .................... B60W 60/0053
2019/0028862 A1*  1/2019  Futaki ..................... H04W 4/44
(Continued)

FOREIGN PATENT DOCUMENTS

JP     2021140470 A     9/2021
JP     2021157403 A     10/2021

OTHER PUBLICATIONS

Office Action issued for counterpart Japanese Application No. 2022-008639, issued by the Japanese Patent Office on Jun. 6, 2023 (drafted on May 29, 2023).

*Primary Examiner* — Aniss Chad
*Assistant Examiner* — Hussam Aldeen Alzateemeh

(57) ABSTRACT

An information processing apparatus includes a risk area identification unit configured to identify a risk area outside a moving object and a transmission control unit configured to perform control for transmitting risk area information representing the risk area identified by the risk area identification unit to a server configured to retain information related to the risk area, in which the risk area identification unit is configured to identify an area defined by a plurality of points as the risk area, and the risk area identification unit is configured to identify, based on a boundary between a first area in which the moving object is prohibited from moving and a second area in which the moving object is allowed to move, a shape of the risk area on a side of the first area.

20 Claims, 12 Drawing Sheets

(58) Field of Classification Search
USPC .......................................................... 701/301
See application file for complete search history.

(56) References Cited

U.S. PATENT DOCUMENTS

| | | |
|---|---|---|
| 2021/0192224 A1* | 6/2021 | Nakagawa ............. G06V 40/10 |
| 2021/0281968 A1 | 9/2021 | Kurehashi |
| 2021/0300362 A1 | 9/2021 | Yasui |
| 2022/0036735 A1* | 2/2022 | Wang ................ B60W 50/0098 |

* cited by examiner

INFORMATION PROCESSING APPARATUS, MOVING OBJECT, SYSTEM, INFORMATION PROCESSING METHOD, AND COMPUTER-READABLE STORAGE MEDIUM TO IDENTIFY A RISK AREA

The contents of the following Japanese patent application (s) are incorporated herein by reference:
NO. 2022-008639 filed on Jan. 24, 2022.

BACKGROUND

1. Technical Field

The present invention relates to an information processing apparatus, a moving object, a system, an information processing method, and a computer-readable storage medium.

2. Related Art

Patent Document 1 describes a system in which a MEC server manages a risk area, and the MEC server provides information on the risk area to each vehicle.

PRIOR ART DOCUMENT

Patent Document 1: Japanese Patent Application Publication No. 2021-140470

DESCRIPTION OF EXEMPLARY EMBODIMENTS

Hereinafter, embodiments of the present invention will be described, but the embodiments do not limit the invention according to the claims. In addition, not all of the combinations of features described in the embodiments are essential to the solution of the invention.

Figure 1:
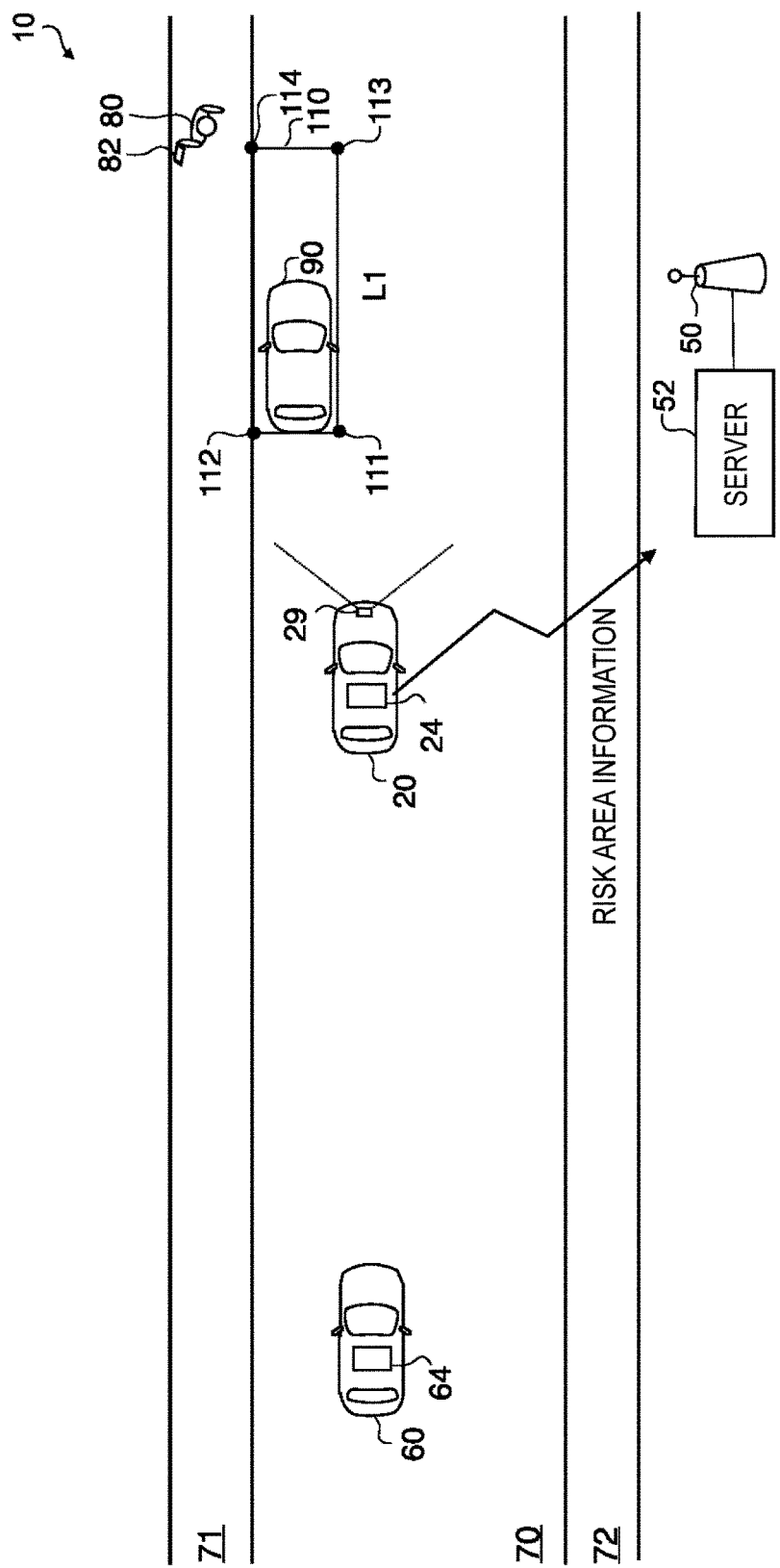
FIG. 1 schematically illustrates a usage scene of a system 10.

FIG. 1 schematically illustrates a usage scene of a system 10. The system 10 includes a vehicle 20, a vehicle 60, a terminal 82, a base station 50, and a server 52.

The vehicle 20 and the vehicle 60 are vehicles that travel on a roadway 70. The vehicle 20 and the vehicle 60 are each an example of a moving object. The vehicle 20 includes an information processing apparatus 24 and a sensor 29. The sensor 29 is configured to include a camera. The information processing apparatus 24 has a function of processing information acquired by the sensor 29 and a communication function with the server 52. The vehicle 20 is a vehicle having, for example, an advanced driver-assistance systems (ADAS) function. The vehicle 60 includes an information processing apparatus 64. The information processing apparatus 64 has a communication function with the server 52. The vehicle 60 is a vehicle that does not have the ADAS function, for example.

The terminal 82 is a terminal possessed by a person 80. The terminal 82 is, for example, a mobile terminal such as a smartphone. The base station 50 is a base station for mobile communication. The server 52 is a server connected to the base station 50. The server 52 may include an edge computing server such as a mobile edge computing (MEC) server, for example. The server 52 continuously manages location information of the terminal 82. It is to be noted that although FIG. 1 illustrates one server 52, the server 52 may be constituted by a plurality of servers respectively connected to a plurality of base stations on a one-on-one basis. The information processing apparatus 24 may communicate with a server in the vicinity of the vehicle 20 out of the plurality of servers constituting the server 52, and the information processing apparatus 64 may communicate with a server in the vicinity of the vehicle 60 out of the plurality of servers constituting the server 52.

In FIG. 1, the vehicle 20 and the vehicle 60 are vehicles that travel on the roadway 70. A vehicle 90 is a vehicle parked on the roadway 70. The vehicle 60 travels behind the vehicle 20 in the same traveling direction as the vehicle 20. A sidewalk 71 and a sidewalk 72 are respectively provided on both sides of the roadway 70.

For the vehicle 20, an area 110 on a traveling direction side of the vehicle 20 in front of the parked vehicle 90 is an area that is difficult to be visually recognized from a position of the vehicle 20. The information processing apparatus 24 identifies the area 110 that cannot be clearly viewed from the vehicle 20 as a risk area, based on information such as an image in a traveling direction acquired by the sensor 29.

For example, the information processing apparatus 24 determines four vertexes 111, 112, 113, and 114 of a quadrangular area 110 including the position of the vehicle 90 based on recognition information of an image acquired by the sensor 29. The vertex 113 is a point apart, in the traveling direction of the vehicle 20 by a distance L1, from the vertex 111 determined based on the recognition information of the image. The vertex 114 is a point apart, in the traveling direction of the vehicle 20 by the distance L1, from the vertex 112 determined based on the recognition information of the image. L1 is a distance that has been determined according to a vehicle speed of the vehicle 20. The information processing apparatus 24 determines the vertex 111 and the vertex 113 such that a line segment connecting the vertex 111 and the vertex 113 is parallel to the traveling direction of the vehicle 20, and the line segment connecting the vertex 111 and the vertex 113 is in contact with an area in which the vehicle 90 recognized by the sensor 29 is present. Moreover, the information processing apparatus 24 determines the vertex 111 and the vertex 112 such that a line segment connecting the vertex 111 and the vertex 112 is substantially orthogonal to the traveling direction of the vehicle 20 and also is in contact with the area in which the vehicle 90 recognized by the sensor 29 is present. Further, the information processing apparatus 24 determines the vertex 112 and the vertex 114 such that a line segment connecting the vertex 112 and the vertex 114 does not substantially intersect with the sidewalk 71. Accordingly, the information processing apparatus 24 can limit the risk area to be within a range as small as possible. In particular, the information processing apparatus 24 can determine the risk area so as not to include the sidewalk 71.

When inquiring the server 52 of whether the terminal 82 is present in the area 110, the information processing apparatus 24 transmits risk area information including the four vertexes 111, 112, 113, and 114 to the server 52. In the example shown in FIG. 1, since the terminal is not present in the area 110 defined by the four vertexes 111, 112, 113, and 114, the server 52 discards the risk area information or transmits response information notifying that the terminal 82 is not present to the vehicle 20. The server 52 stores the four vertexes 111, 112, 113, and 114 included in the risk area information received from the information processing apparatus 24.

Figure 2:
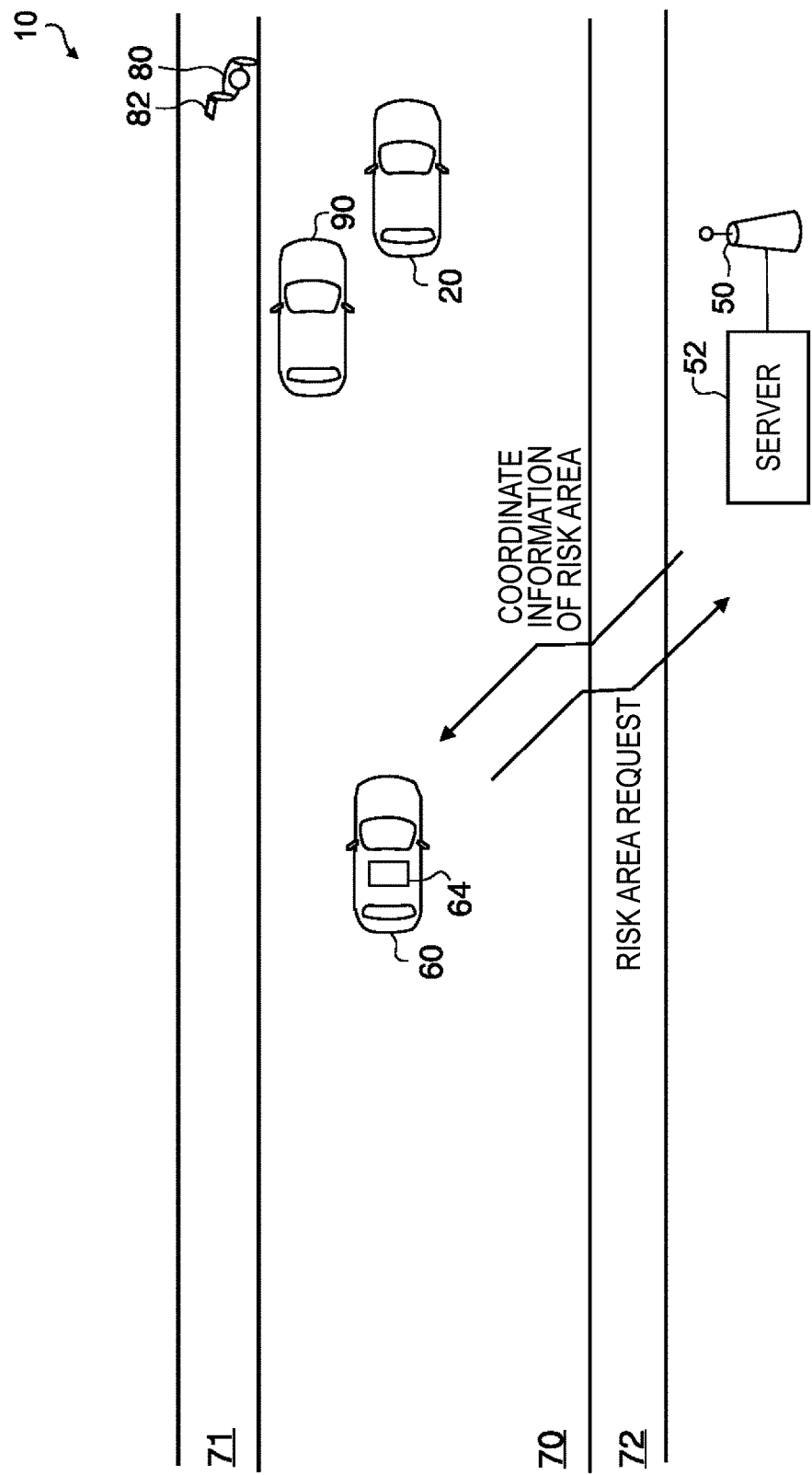
FIG. 2 illustrates a situation where an information processing apparatus 64 included in a vehicle 60 requests location information of a risk area.

FIG. 2 illustrates a situation where the information processing apparatus 64 included in the vehicle 60 requests location information of a risk area. The information processing apparatus 64 transmits a risk area request to the server 52 when being present in an area in which the information processing apparatus 64 is communicable with the server 52. The server 52 transmits stored coordinate information of the vertex 111 and the vertex 112 of the area 110 to the information processing apparatus 64 as response information with respect to the risk area request. The information processing apparatus 64 stores the coordinate information of the vertex 111 and the vertex 112 received from the server 52.

Figure 3:
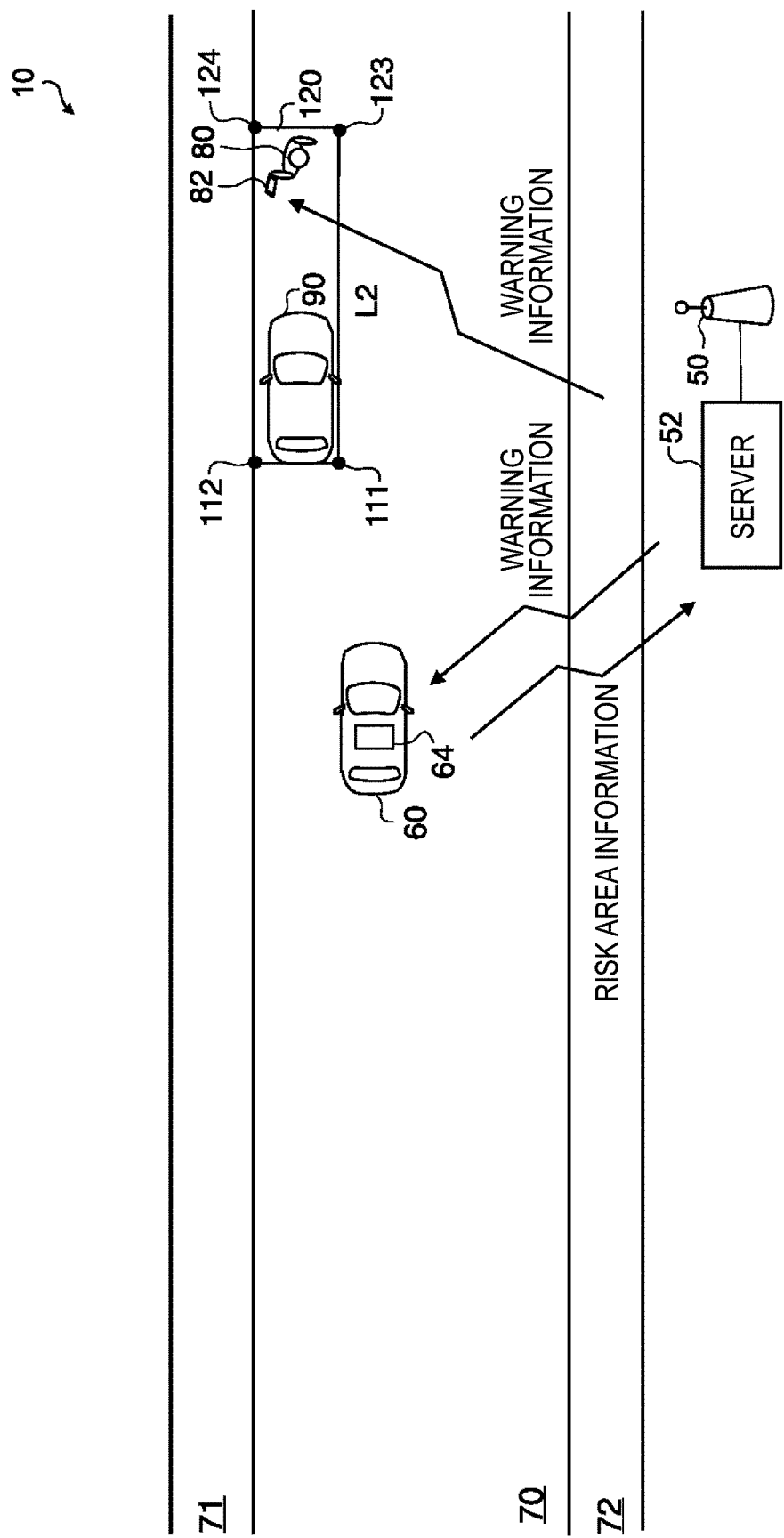
FIG. 3 illustrates a situation where the information processing apparatus 64 performs an inquiry related to the risk area.

FIG. 3 illustrates a situation where the information processing apparatus 64 performs an inquiry related to the risk area. When a distance between the vehicle 60 and a position represented by the coordinate information of at least one of the vertex 111 or the vertex 112 becomes smaller than a predetermined distance, the information processing apparatus 64 sets an area 120 defined by the vertex 111, the vertex 112, a vertex 123, and a vertex 124 as the risk area for the vehicle 60. For example, the information processing apparatus 64 determines, as the vertex 123, a point apart from the vertex 111 in the traveling direction of the vehicle 60 by a distance L2 that has been determined according to the vehicle speed of the vehicle 60, and determines, as the vertex 124, a point apart from the vertex 112 in the traveling direction of the vehicle 60 by the distance L2. Similar to the method of determining the vertex 113 and the vertex 114 by the information processing apparatus 24, the information processing apparatus 64 determines the vertex 123 and the vertex 124 such that the area 120 does not include the sidewalk 71.

The information processing apparatus 64 transmits, to the server 52, risk area information including coordinate information of the vertex 111, the vertex 112, the vertex 123, and the vertex 124 of the area 120 set as the risk area. When location information of the terminal 82 managed by the server 52 is included in the area 120 surrounded by the vertexes included in the risk area information, the server 52 transmits warning information to the information processing apparatus 64 and the terminal 82. Upon receiving the warning information from the server 52, the information processing apparatus 64 outputs a warning to a passenger of the vehicle 60. For example, the information processing apparatus 64 outputs a warning to the passenger using an HMI (Human Machine Interface) function of the vehicle 20. Accordingly, even when the information processing apparatus 64 itself does not have a function of recognizing the risk area by sensing means such as a camera, the information processing apparatus 64 can output a warning using the risk area received from the server 52 using a wireless communication function. In addition, upon receiving the warning information from the server 52, the terminal 82 outputs a warning to the person 80. For example, the terminal 82 outputs a warning to the person 80 using an HMI function of the terminal 82.

In this manner, the information processing apparatus 24 and the information processing apparatus 64 can identify the risk area such that the risk area does not include the sidewalk 71. This can prevent a warning from being output to the terminal 82 or the vehicle just because of the presence of a person walking along the sidewalk.

Figure 4:
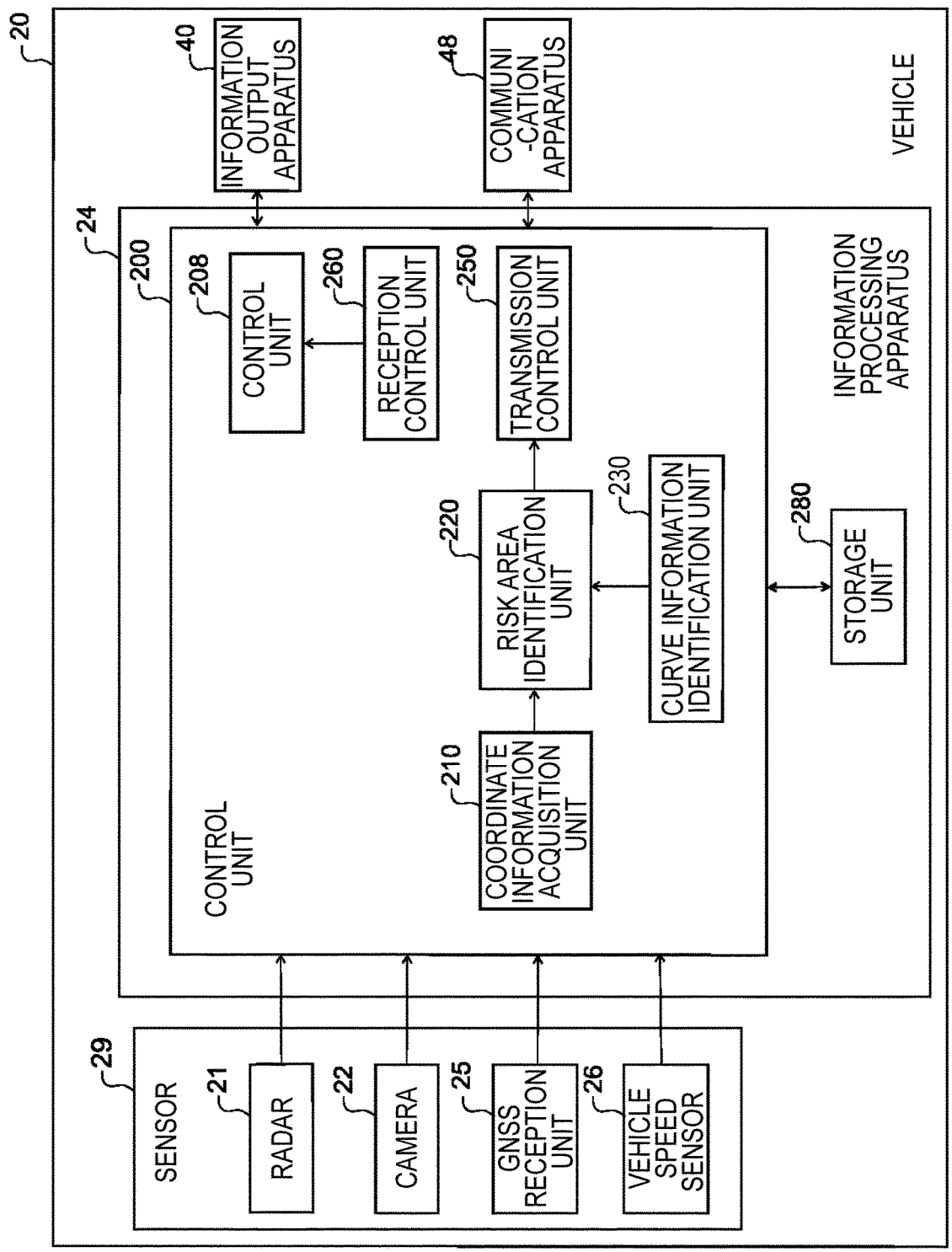
FIG. 4 illustrates a system configuration of a vehicle 20.

FIG. 4 illustrates a system configuration of the vehicle 20. The vehicle 20 includes the sensor 29, the information processing apparatus 24, a communication apparatus 48, and an information output apparatus 40.

The sensor 29 includes a radar 21, a camera 22, a GNSS reception unit 25, and a vehicle speed sensor 26. The radar 21 may be LiDAR, a millimeter wave radar, or the like. The GNSS reception unit 25 receives a radio wave transmitted from a GNSS (Global Navigation Satellite System) satellite. The GNSS reception unit 25 generates information representing a current location of the vehicle 20 based on a signal received from the GNSS satellite. The camera 22 is an example of an image capturing apparatus mounted on the vehicle 20. The camera 22 captures an image around the vehicle 20 to generate image information. For example, the camera 22 captures an image in the traveling direction of the vehicle 20 to generate image information. The camera 22 may be a monocular camera. The camera 22 may be a compound eye camera, or may be a camera capable of acquiring distance information to an object. The camera 22 recognizes an object based on an image acquired by an image capturing function, and outputs location information of the recognized object. The vehicle speed sensor 26 detects a vehicle speed of the vehicle 20. It is to be noted that the sensor 29 may include a position sensor such as an odometer or IMU (Inertial Measurement Unit) such as an acceleration sensor and an attitude sensor.

It is to be noted that the vehicle 20 may include a driver assistance control apparatus that performs driver assistance of the vehicle 20 using information detected by the sensor 29. The driver assistance control apparatus may be realized by an ECU that provides the ADAS function.

The communication apparatus 48 is responsible for communication with the server 52. The communication apparatus 48 may communicate with the server 52 by mobile communication. The communication apparatus 48 may be communicable through an interface for communication via a mobile base station for vehicle-to-vehicle communication (Uu), for example.

The information output apparatus 40 is an apparatus that outputs warning information. The information output apparatus 40 may have an HMI function. The information output apparatus 40 may include a head-up display and a navigation system. The information output apparatus 40 may be a mobile terminal possessed by a passenger of the vehicle 20. The information output apparatus 40 may include a voice output apparatus configured to output warning information by voice.

The information processing apparatus 24 includes a control unit 200 and a storage unit 280. The control unit 200 is realized by, for example, a circuit of a calculation processing apparatus or the like including a processor. The storage unit 280 is realized by including a nonvolatile storage medium. The storage unit 280 stores road information. For example, the storage unit 280 includes, as the road information, location information of a traffic lane, location information of a sidewalk, information representing a position and shape of a boundary between a roadway and a sidewalk, information representing a curvature radius of the boundary between the roadway and the sidewalk, and the like. The control unit 200 performs processing using information stored in the storage unit 280. The control unit 200 may be realized by an ECU (Electronic Control Unit) including a microcomputer including a CPU, a ROM, a RAM, an I/O, a bus, and the like.

The control unit 200 includes a coordinate information acquisition unit 210, a risk area identification unit 220, a curve information identification unit 230, a control unit 208, a transmission control unit 250, and a reception control unit 260. It is to be noted that a configuration may be adopted in which the control unit 200 does not have some functions in the functional blocks shown in FIG. 4. For example, a configuration may be adopted in which only some of the functions are implemented in the control unit 200, and other functions are implemented as functions of other circuits such as the sensor 29.

The risk area identification unit 220 identifies a risk area outside the vehicle 20. The transmission control unit 250 performs control for transmitting risk area information representing a risk area identified by the risk area identification unit 220 to the server 52 that retains information related to the risk area.

It is to be noted that the risk area may be an area outside the vehicle 20, which becomes a risk regarding the movement of the vehicle 20. The risk area may be an area that cannot be clearly viewed from the position of the vehicle 20 due to an object outside the vehicle 20. The area that cannot be clearly viewed is, for example, location information of an area where occlusion has occurred due to blocking by a three-dimensional object such as another vehicle, a building, and a roadside tree when seen from the position of the vehicle 20.

The coordinate information acquisition unit 210 acquires coordinate information of an object recognized from an image of outside the vehicle 20, that has been captured by the camera 22 mounted on the vehicle 20. The risk area identification unit 220 may identify the risk area based on the coordinate information of the object recognized from the image of outside the vehicle 20 that has been captured by the camera 22.

The risk area identification unit 220 identifies an area defined by a plurality of points as the risk area. The risk area identification unit 220 identifies, based on a boundary between a first area in which the vehicle 20 is prohibited from moving and a second area in which the vehicle 20 is allowed to move, a shape of the risk area on the first area side. The second area in which the vehicle 20 is allowed to move is, for example, the roadway 70. The second area in which the vehicle 20 is allowed to move is a driving lane of the roadway 70 on which the vehicle 20 is capable of traveling in a current orientation. The sidewalk 71 is an example of the first area that is adjacent to the second area and in which the vehicle 20 is prohibited from moving.

The risk area identification unit 220 may identify the shape of the risk area by a polygon having at least one point on the boundary as a vertex. The risk area identification unit 220 may set the vertex on the vehicle 20 side and identify the shape of the risk area by a straight line extending, from the vertex, substantially parallel to the moving direction of the moving object.

The risk area identification unit 220 may identify the shape of the risk area based on a shape of the boundary between the first area and the second area. The risk area identification unit 220 may identify the shape of the risk area on the first area side by a tangent of the boundary. The risk area identification unit 220 may set a first point farthest from the first area and a second point closest to the vehicle 20, identify the shape of the risk area on an opposite side of the first area by a line that passes through the first point and is parallel to the moving direction of the vehicle 20, and identify the shape of the risk area on the vehicle 20 side by a line that passes through the second point and is substantially orthogonal to the moving direction of the vehicle 20.

The curve information identification unit 230 identifies a curve direction of the boundary up ahead in the moving direction of the vehicle 20. The curve information identification unit 230 identifies the curve direction of the boundary up ahead in the moving direction of the vehicle 20 based on boundary information and a position of the vehicle 20 stored in the storage unit 280. When the curve direction of the boundary is a direction in which the boundary is directed toward the first area side with respect to the moving direction of the vehicle 20, the risk area identification unit 220 may identify the shape of the risk area on the first area side by a tangent of the boundary. When the curve direction of the boundary is a direction in which the boundary is directed toward the opposite side of the first area side with respect to the moving direction of the vehicle 20, the risk area identification unit 220 may identify the shape on the first area side by a line extending along the boundary. The risk area identification unit 220 may identify a length of the risk area in the direction along the moving direction of the vehicle 20 according to a speed of the vehicle 20. For example, the risk area identification unit 220 may identify such that the risk area becomes longer in the direction along the moving direction of the vehicle 20 as the speed of the vehicle 20 becomes higher.

The control unit 208 may perform control to execute driver assistance of the vehicle 20 or warning with respect to the passenger of the vehicle 20. For example, when the information output apparatus 40 includes a head-up display, the control unit 208 may cause the head-up display of the vehicle 20 to output light for forming a mark as warning information representing that a pedestrian is present in the risk area. In addition, the control unit 208 causes the head-up display to output light for forming a mark in a display area corresponding to a position of the risk area in which the pedestrian is present. The control unit 208 may project the light for forming a mark toward a reflective member provided to a windshield of the vehicle 20. It is to be noted that the control unit 208 may output the warning information by voice or characters. Further, the control unit 208 may control traveling of the vehicle 20 through the driver assistance control apparatus included in the vehicle 20.

Figure 5:
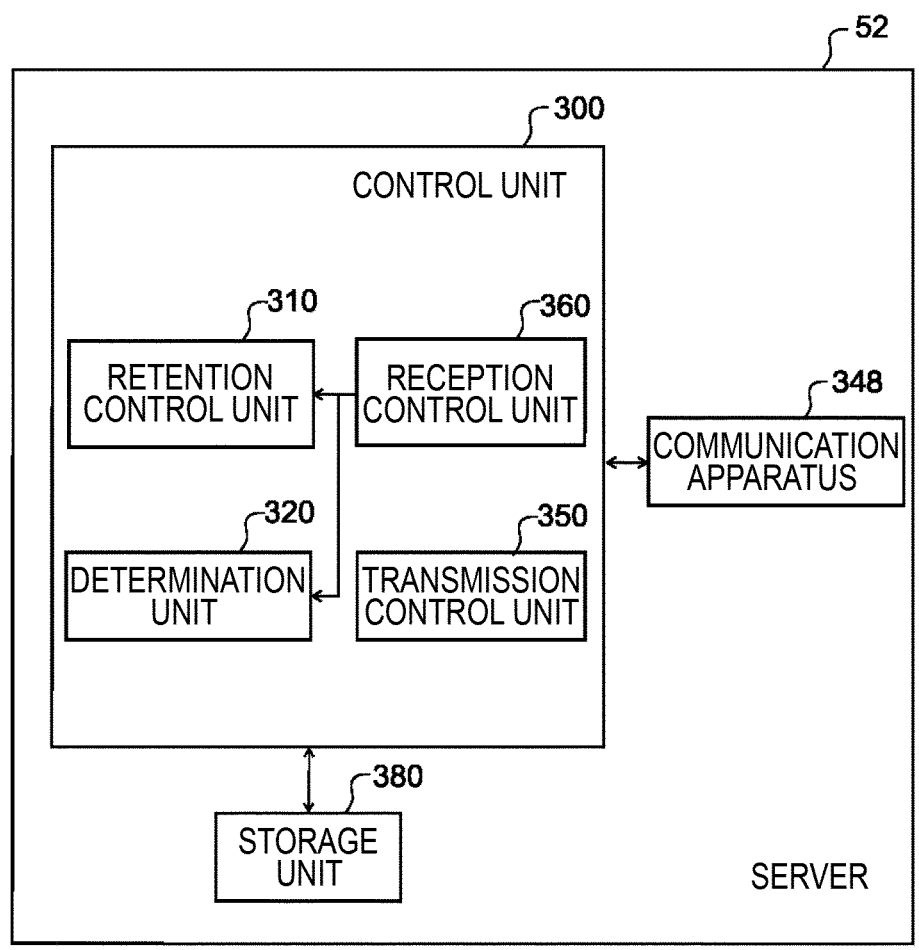
FIG. 5 illustrates a system configuration of a server 52.

FIG. 5 illustrates a system configuration of the server 52. The server 52 includes a communication apparatus 348, a control unit 300, and a storage unit 380.

The control unit 300 controls the communication apparatus 348. The communication apparatus 348 assumes communication with the terminal 82 and the information processing apparatus 24. The control unit 300 is realized by, for example, a circuit of a calculation processing apparatus or the like including a processor. The storage unit 380 is realized by including a nonvolatile storage medium. The control unit 300 performs processing by using information stored in the storage unit 380. The control unit 300 may be realized by a microcomputer including a CPU, a ROM, a RAM, an I/O, a bus, and the like.

The control unit 300 includes a retention control unit 310, a determination unit 320, a transmission control unit 350, and a reception control unit 360. It is to be noted that a configuration in which the control unit 300 does not have some functions out of the functional blocks shown in FIG. 5 may be adopted.

The reception control unit 360 performs control for receiving risk area information representing a risk area outside the vehicle 20, that has been identified by the vehicle 20. The retention control unit 310 performs control for retaining information related to the risk area. For example, the retention control unit 310 causes the storage unit 380 to store the information related to the risk area. The risk area information includes a plurality of points that define the risk area. The retention control unit 310 performs control for retaining coordinate information of the plurality of points included in the risk area information. For example, the retention control unit 310 causes the storage unit 380 to store the coordinate information of the plurality of points included in the risk area information.

The reception control unit 360 performs control for periodically receiving location information of a plurality of terminals including the terminal 82. By storing the location information of the plurality of terminals received under control of the reception control unit 360 in the storage unit 380, the server 52 manages the location information of each of the plurality of terminals.

The reception control unit 360 receives the risk area information from the vehicle 20 or the vehicle 60. The risk area information is information transmitted from the vehicle 20 or the vehicle 60, and is information used for inquiring whether any of the terminals whose location information is managed by the server 52 is present in the risk area. The risk area information may include all coordinates of a plurality of vertexes that define the risk area. The determination unit 320 determines, based on the location information of the terminals managed by the server 52, whether any of the terminals is present in the risk area defined by the plurality of vertexes included in the risk area information. When determining that one of the terminals is present in the risk area, the transmission control unit 250 performs control for transmitting response information notifying that the terminal is present to the vehicle 20 or the vehicle 60 as a transmission source of the inquiry information.

Figure 6:
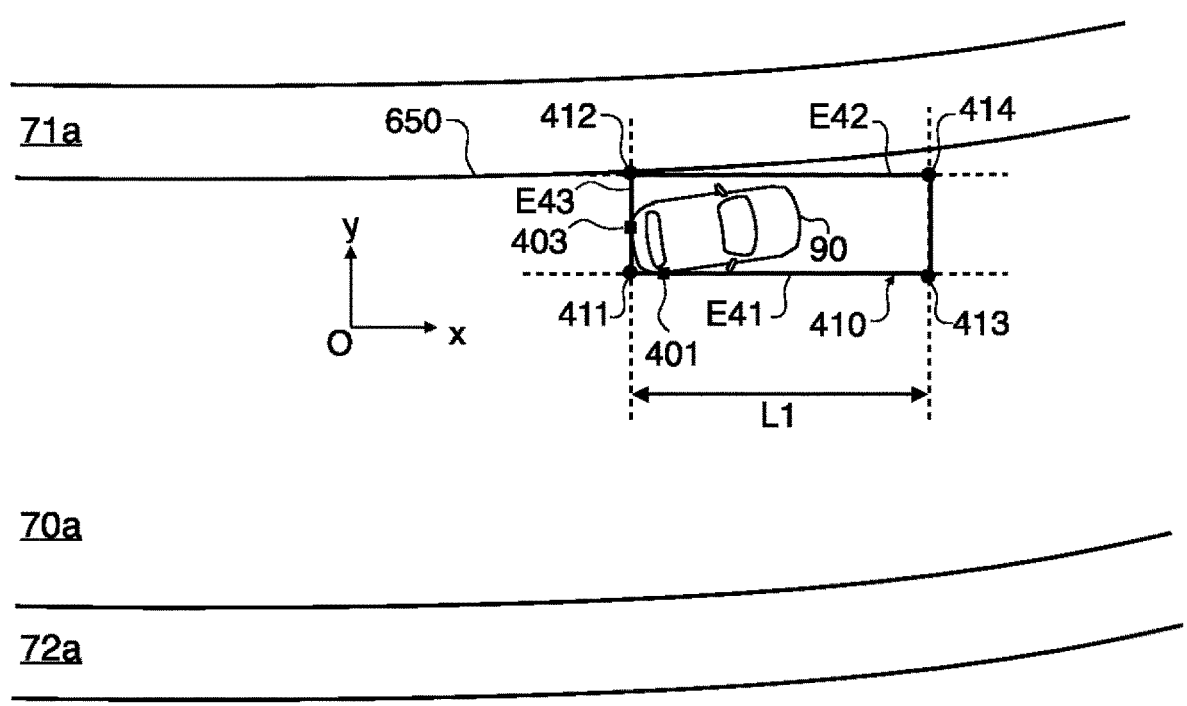
FIG. 6 schematically illustrates a risk area identified by a risk area identification unit 220.

FIG. 6 schematically illustrates a risk area identified by the risk area identification unit 220. FIG. 6 illustrates an example of the risk area identified when the vehicle 90 is parked in the middle of a left-hand curve. A sidewalk 71a and a sidewalk 72a are respectively provided on both sides of a roadway 70a on which the vehicle 20 is movable.

The sensor 29 outputs coordinate information representing a position at which an object recognized by the sensor 29 is present. For example, using a coordinate system in which a traveling direction of the vehicle 20 is set as an x axis plus direction and a direction that is parallel to a plane parallel to a road surface on which the vehicle 20 travels and is orthogonal to the x axis is set as a y axis direction, for example, the sensor 29 outputs coordinate information of a position at which the object is present. A point of origin O of the coordinate system is set to a position preset in the vehicle 20. For example, in the example shown in FIG. 6, the sensor 29 outputs coordinate information including coordinates of a position 401 and coordinates of a position 403.

The position 401 is a position most on the y direction minus side out of the positions at which the object has been recognized by the sensor 29, and the position 403 is a position most on the x direction minus side out of the positions at which the object has been recognized by the sensor 29. In other words, the position 401 is a position farthest from the sidewalk 71a out of the positions at which the object has been recognized by the sensor 29. The position 403 is a position closest to the vehicle 20 out of the positions at which the object has been recognized by the sensor 29.

The risk area identification unit 220 identifies an area 410 as the risk area based on the coordinate information acquired by the coordinate information acquisition unit 210. The area 410 is a rectangular area defined by connecting a vertex 411, a vertex 412, a vertex 414, and a vertex 413.

The risk area identification unit 220 sets the position 401 farthest from the sidewalk 71a and the position 403 closest to the vehicle 20, identifies a shape of the area 410 on an opposite side of the sidewalk 71a by a line E41 that passes through the position 401 and is parallel to the moving direction of the vehicle 20, and identifies a shape of the area 410 on the vehicle 20 side by a line E43 that passes through the position 403 and is orthogonal to the moving direction of the vehicle 20.

The vertex 411 is determined as an intersection point between the line E41 and the line E43. The vertex 413 is determined at a position apart from the vertex 411 in the x axis plus direction by the distance L1. L1 is determined such that it becomes longer as the vehicle speed of the vehicle 20 becomes higher.

The risk area identification unit 220 identifies the shape of the area 410 on the sidewalk 71a side based on a boundary 650 between the sidewalk 71a and the roadway 70a. For example, the risk area identification unit 220 sets the vertex 412 on the boundary 650. More specifically, the risk area identification unit 220 sets the vertex 412 at an intersection point between the boundary 650 and the line E43. The vertex 414 is determined at a position apart from the vertex 412 in the x axis plus direction by the distance L1.

In this manner, the risk area identification unit 220 identifies the shape of the risk area by a polygon having at least one point on the boundary 650 as a vertex. In particular, the risk area identification unit 220 identifies the shape of the area 410 on the sidewalk 71a side by a line E42 which is a straight line extending to be parallel to the moving direction of the vehicle 20. Accordingly, the risk area identification unit 220 can identify the risk area so as not to include the sidewalk 71a as much as possible. Further, a range that the risk area occupies can be limited effectively.

Figure 7:
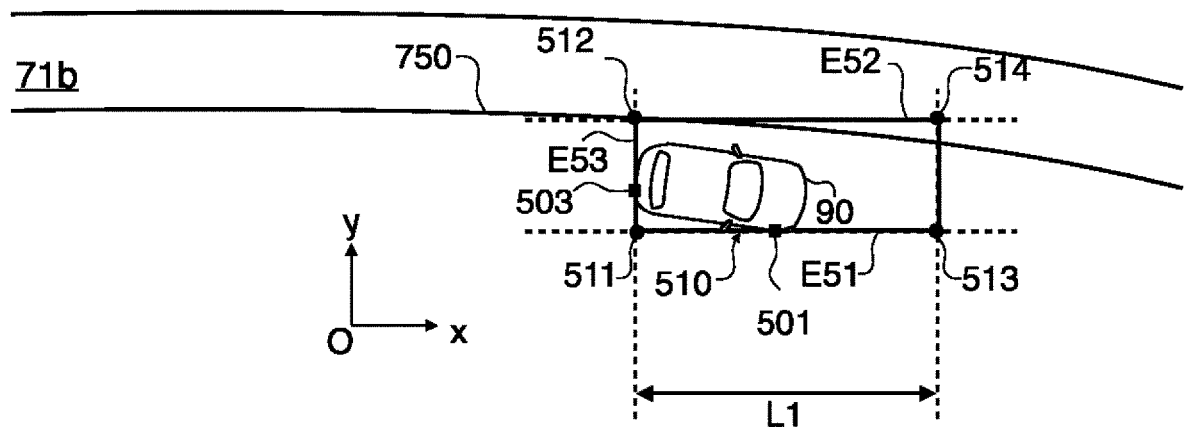
FIG. 7 schematically illustrates another example of the risk area identified by the risk area identification unit 220.

FIG. 7 schematically illustrates another example of the risk area identified by the risk area identification unit 220. FIG. 7 illustrates an example of the risk area identified when the vehicle 90 is parked in the middle of a right-hand curve. A sidewalk 71b and a sidewalk 72b are respectively provided on both sides of a roadway 70b on which the vehicle 20 is movable.

In the example shown in FIG. 7, the sensor 29 outputs coordinate information including coordinates of a position 501 and coordinates of a position 503. The position 501 is a position most on the y direction minus side out of the positions at which the object has been recognized by the sensor 29, and the position 503 is a position most on the x direction minus side out of the positions at which the object has been recognized by the sensor 29. In other words, the position 501 is a position farthest from the sidewalk 71b out of the positions at which the object has been recognized by the sensor 29. The position 503 is a position closest to the vehicle 20 out of the positions at which the object has been recognized by the sensor 29.

The risk area identification unit 220 identifies an area 510 as the risk area based on the coordinate information acquired by the coordinate information acquisition unit 210. The area 510 is a rectangular area defined by connecting a vertex 511, a vertex 512, a vertex 514, and a vertex 513.

The risk area identification unit 220 sets the position 501 farthest from the sidewalk 71*b* and the position 503 closest to the vehicle 20 out of the positions of the recognized object, identifies a shape of the area 510 on an opposite side of the sidewalk 71*b* by a line E51 that passes through the position 501 and is parallel to the moving direction of the vehicle 20, and identifies a shape of the area 510 on the vehicle 20 side by a line E53 that passes through the position 503 and is orthogonal to the moving direction of the vehicle 20. The vertex 511 is determined as an intersection point between the line E51 and the line E53. The vertex 513 is determined at a position apart from the vertex 511 in the x axis plus direction by the distance L1.

The risk area identification unit 220 identifies the shape of the area 510 on the sidewalk 71*b* side based on a boundary 750 between the sidewalk 71*b* and the roadway 70*b*. For example, the risk area identification unit 220 sets the vertex 512 on the boundary 750. More specifically, the risk area identification unit 220 sets the vertex 512 at an intersection point between the boundary 750 and the line E53.

The vertex 514 is determined at a position apart from the vertex 512 in the x axis plus direction by the distance L1. L1 is determined according to the vehicle speed of the vehicle 20. L1 is determined such that it becomes longer as the vehicle speed of the vehicle 20 becomes higher.

In this manner, the risk area identification unit 220 identifies the shape of the risk area by a polygon having at least one point on the boundary 750 as a vertex. In particular, the risk area identification unit 220 identifies the shape of the area 510 on the sidewalk 71*b* side by a line E52 which is a straight line extending to be parallel to the moving direction of the vehicle 20. Accordingly, also when the boundary 750 between the roadway 70*b* and the sidewalk 71*b* is curved in a right-hand direction, the risk area can be identified such that an area including the sidewalk 71*b* becomes small. Further, a range that the risk area occupies can be limited effectively.

Figure 8:
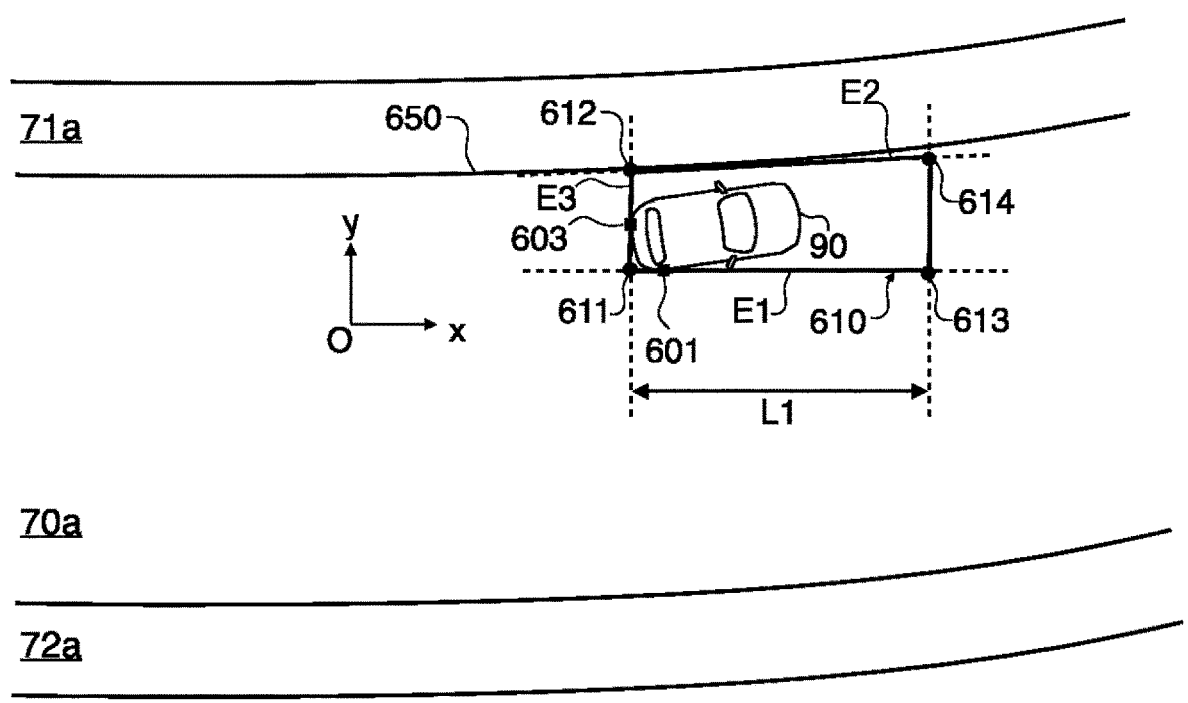
FIG. 8 schematically illustrates another example of the risk area identified by the risk area identification unit 220.

FIG. 8 schematically illustrates another example of the risk area identified by the risk area identification unit 220. FIG. 8 illustrates an example of the risk area identified when the vehicle 90 is parked in the middle of a left-hand curve. A sidewalk 71*a* and a sidewalk 72*a* are respectively provided on both sides of the roadway 70*a* on which the vehicle 20 is movable.

The sensor 29 outputs coordinate information representing a position at which an object recognized by the sensor 29 is present. For example, using a coordinate system in which the traveling direction of the vehicle 20 is set as the x axis plus direction and a direction that is parallel to a plane parallel to a road surface on which the vehicle 20 travels and is orthogonal to the x axis is set as a y axis direction, for example, the sensor 29 outputs coordinate information of a position at which the object is present. The point of origin O of the coordinate system is set to a position preset in the vehicle 20. For example, in the example shown in FIG. 8, the sensor 29 outputs coordinate information including coordinates of a position 601 and coordinates of a position 603. The position 601 is a position most on the y direction minus side out of the positions at which the object has been recognized by the sensor 29, and the position 603 is a position most on the x direction minus side out of the positions at which the object has been recognized by the sensor 29. In other words, the position 601 is a position farthest from the sidewalk 71*a* out of the positions at which the object has been recognized by the sensor 29. The position 603 is a position closest to the vehicle 20 out of the positions at which the object has been recognized by the sensor 29.

The risk area identification unit 220 identifies an area 610 as the risk area based on the coordinate information acquired by the coordinate information acquisition unit 210. The area 610 is a rectangular area defined by connecting a vertex 611, a vertex 612, a vertex 614, and a vertex 613.

The risk area identification unit 220 sets the position 601 farthest from the sidewalk 71*a* and the position 603 closest to the vehicle 20, identifies a shape of the area 610 on an opposite side of the sidewalk 71*a* by a line E1 that passes through the position 601 and is parallel to the moving direction of the vehicle 20, and identifies a shape of the area 610 on the vehicle 20 side by a line E3 that passes through the position 603 and is orthogonal to the moving direction of the vehicle 20.

The risk area identification unit 220 identifies the shape of the area 610 on the sidewalk 71*a* side by a tangent of the boundary 650 between the sidewalk 71*a* and the roadway 70*a*. For example, the vertex 612 and the vertex 614 are positions on a line E2 which is a tangent of the boundary 650 at the vertex 612.

The vertex 613 is determined at a position apart from the vertex 611 in the x axis plus direction by the distance L1. The vertex 614 is determined at a position apart from the vertex 612 in the x axis plus direction by the distance L1. L1 is determined according to the vehicle speed of the vehicle 20. L1 is determined such that it becomes longer as the vehicle speed of the vehicle 20 becomes higher.

Accordingly, the risk area identification unit 220 can identify the risk area so as not to substantially include the sidewalk 71*a*. Further, a range that the risk area occupies can be limited effectively.

Figure 9:
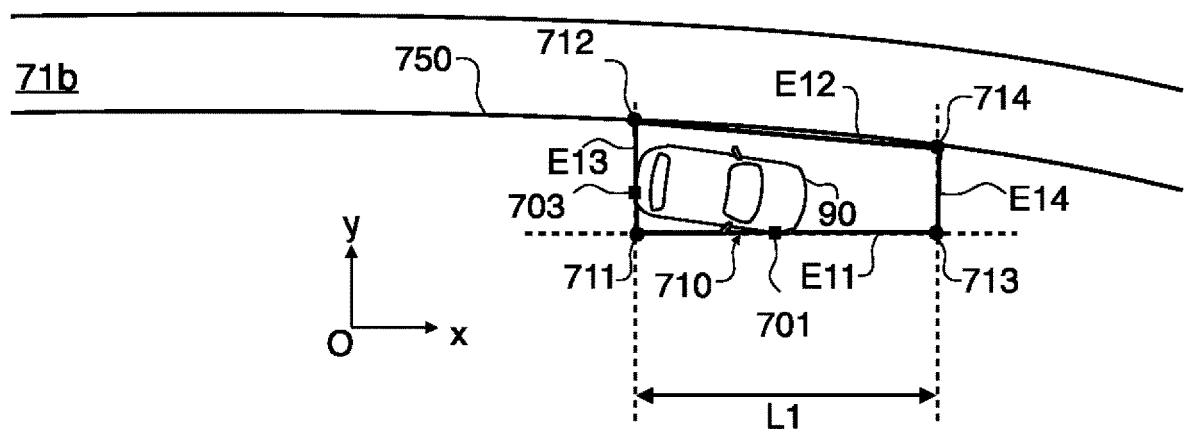
FIG. 9 schematically illustrates another example of the risk area identified by the risk area identification unit 220.

FIG. 9 schematically illustrates another example of the risk area identified by the risk area identification unit 220. FIG. 9 illustrates an example of the risk area identified when the vehicle 90 is parked in the middle of a right-hand curve. The sidewalk 71*b* and the sidewalk 72*b* are respectively provided on both sides of the roadway 70*b* on which the vehicle 20 is movable.

In the example shown in FIG. 9, the sensor 29 outputs coordinate information including coordinates of a position 701 and coordinates of a position 703. The position 701 is a position most on the y direction minus side out of the positions at which the object has been recognized by the sensor 29, and the position 703 is a position most on the x direction minus side out of the positions at which the object has been recognized by the sensor 29. In other words, the position 701 is a position farthest from the sidewalk 71*b* out of the positions at which the object has been recognized by the sensor 29. The position 703 is a position closest to the vehicle 20 out of the positions at which the object has been recognized by the sensor 29.

The risk area identification unit 220 identifies an area 710 as the risk area based on the coordinate information acquired by the coordinate information acquisition unit 210. The area 710 is a rectangular area defined by connecting a vertex 711, a vertex 712, a vertex 714, and a vertex 713.

The risk area identification unit 220 sets the position 701 farthest from the sidewalk 71*b* and the position 703 closest to the vehicle 20 out of the positions of the recognized object, identifies a shape of the area 710 on an opposite side of the sidewalk 71*b* by a line E11 that passes through the position 701 and is parallel to the moving direction of the vehicle 20, and identifies a shape of the area 710 on the vehicle 20 side by a line E13 that passes through the position 703 and is orthogonal to the moving direction of the vehicle 20.

The vertex 711 is determined as an intersection point between the line E11 and the line E13. The vertex 713 is determined at a position apart from the vertex 711 in the x axis plus direction by the distance L1. L1 is determined according to the vehicle speed of the vehicle 20. L1 is determined such that it becomes longer as the vehicle speed of the vehicle 20 becomes higher. A line E14 is a line that passes through the vertex 713 and is parallel to the line E13. The vertex 714 is a vertex on the boundary 750 and also on the line E14. The vertex 712 is a point on the line E13 and also on the boundary 750.

The risk area identification unit 220 identifies the shape of the area 710 on the sidewalk 71*b* side by a line E12 connecting the vertex 712 and the vertex 714. The line E12 is a line determined based on the shape of the boundary 750. When the boundary 750 is curved in the right-hand direction, the risk area identification unit 220 identifies the line E12 as a side of the area 710 on the sidewalk 71*b* side. Accordingly, also when the boundary 750 between the roadway 70*b* and the sidewalk 71*b* is curved in the right-hand direction, the risk area can be identified so as not to substantially include the sidewalk 71*b*. Further, a range that the risk area occupies can be limited effectively.

Figure 10:
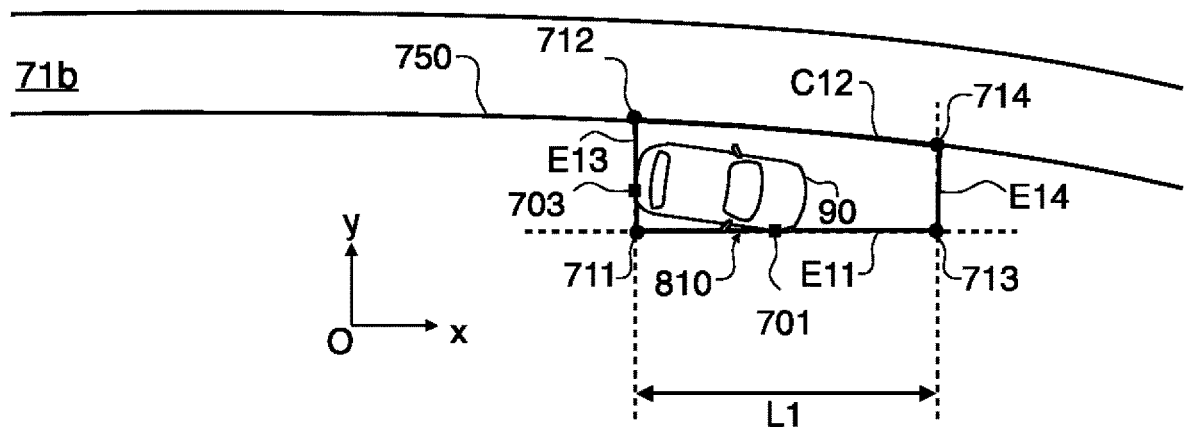
FIG. 10 schematically illustrates another example of the risk area identified by the risk area identification unit 220.

FIG. 10 schematically illustrates another example of the risk area identified by the risk area identification unit 220. FIG. 10 illustrates an example of the risk area identified when the vehicle 90 is parked in the middle of a right-hand curve. The risk area identification unit 220 identifies an area 810 as the risk area. The area 810 shown in FIG. 10 is the same as the area 710 shown in FIG. 9 except for a point that a side on the sidewalk 71*b* side is configured by a curve C12. Therefore, descriptions will be omitted except for the configuration related to the curve C12.

The curve C12 is a line having a shape based on the shape of the boundary 750. The curve C12 is a line along the boundary 750, for example. The risk area identification unit 220 identifies the shape of the area 710 on the sidewalk 71*b* side by the curve C12 along the boundary 750. In this manner, when the boundary 750 is curved in the right-hand direction, the risk area identification unit 220 identifies the curve C12 along the boundary 750 as a side of the area 810 on the sidewalk 71*b* side. Accordingly, also when the boundary 750 between the roadway 70*b* and the sidewalk 71*b* is curved in the right-hand direction, the risk area can be identified so as not to substantially include the sidewalk 71*b*. Further, a range that the risk area occupies can be limited effectively.

It is to be noted that the curve information identification unit 230 may identify a curvature radius of the boundary 750 based on road information stored in the storage unit 280. The risk area identification unit 220 may identify, as the curve C12, a curve that passes through the vertex 712 and has a curvature of the curvature radius of the boundary 750 at the position of the vertex 712. Accordingly, also when the boundary 750 is curved in the right-hand direction, the risk area can be identified so as not to substantially include the sidewalk 71*b*.

It is to be noted that the shape of the area 810 on the opposite side of the sidewalk 71*b* may be a shape formed along the boundary 750. As an example, when the curvature radius of the boundary 750 exceeds a predetermined value, the shape of the area 810 on the opposite side of the sidewalk 71*b* may be set to have a shape formed along the boundary 750. Alternatively, the shape of the area 810 on the opposite side of the sidewalk 71*b* may be identified by a line parallel to a tangent of the boundary 750. Similarly, as a modified example of the shape of the area 710 described in relation to FIG. 9, the shape of the area 710 on the opposite side of the sidewalk 71*b* may be set to be a shape formed along the boundary 750. As an example, when the curvature radius of the boundary 750 exceeds a predetermined value, the shape of the area 710 on the opposite side of the sidewalk 71*b* may be set to be a shape formed along the boundary 750. Alternatively, the shape of the area 710 on the opposite side of the sidewalk 71*b* may be identified by a line parallel to the tangent of the boundary 750.

In addition, as a modified example of the shape of the area 610 described in relation to FIG. 8, when the boundary 650 is curved in the left-hand direction, the shape of the area 610 on the sidewalk 71*a* side may be set to be a shape formed along the boundary 650. Moreover, the shape of the area 610 on the opposite side of the sidewalk 71*a* may be set to be a shape formed along the boundary 650, or the shape of the area 610 on the opposite side of the sidewalk 71*a* may be identified by a line parallel to a tangent of the boundary 650.

Figure 11:
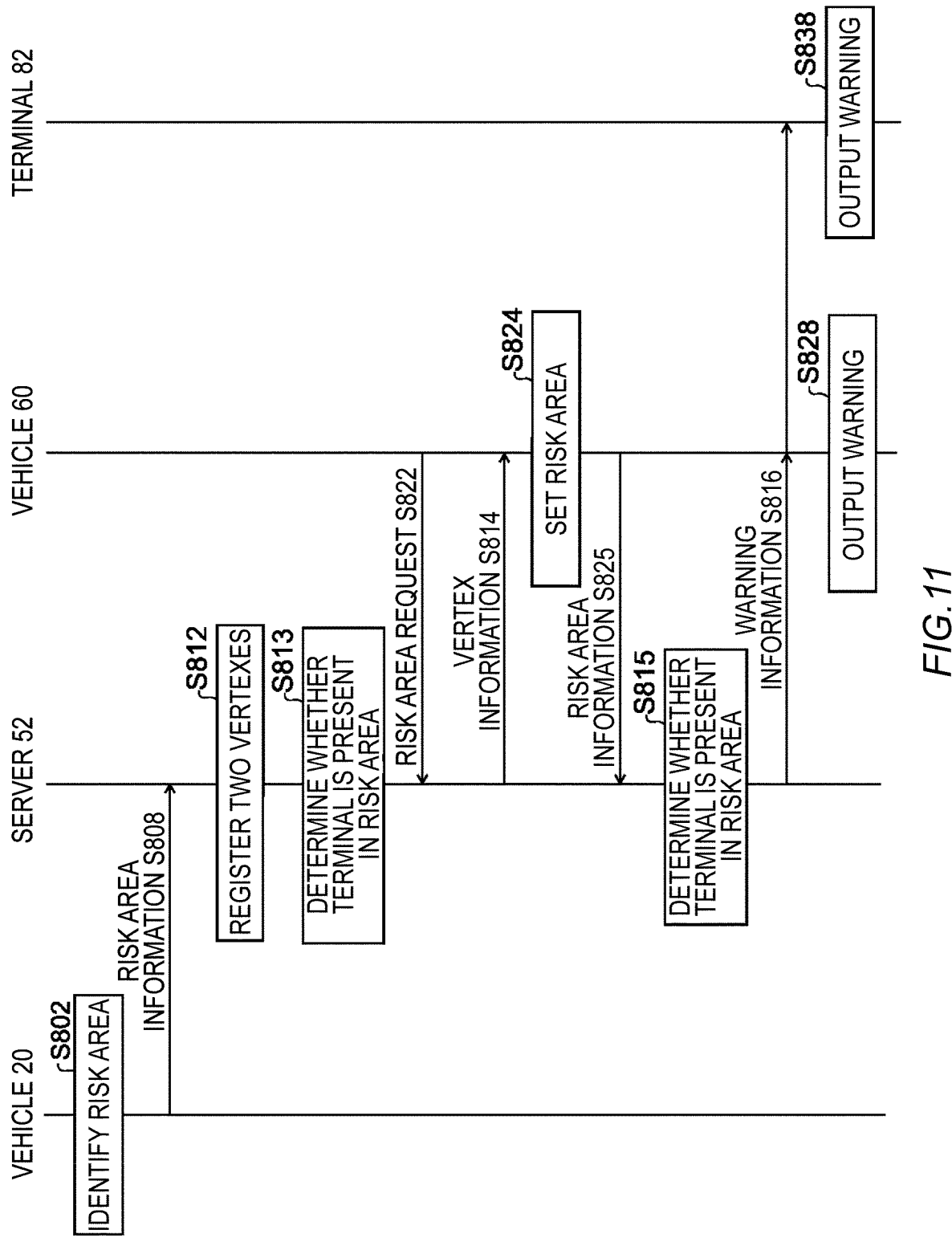
FIG. 11 schematically illustrates a flow of processing related to an information processing method executed by the vehicle 20, the vehicle 60, the server 52, and a terminal 82.

FIG. 11 schematically illustrates a flow of processing related to an information processing method executed by the vehicle 20, the vehicle 60, the server 52, and the terminal 82. In S802, the risk area identification unit 220 identifies a risk area based on information recognized by the sensor 29. For example, the risk area identification unit 220 determines four vertexes that define the risk area 110 based on coordinate information that has been output by the sensor 29 and acquired by the coordinate information acquisition unit 210. For example, the risk area identification unit 220 determines the four vertexes by the method described in relation to FIGS. 6 to 10 and the like, to thus identify the risk area.

In S808, the transmission control unit 250 transmits risk area information that requests an inquiry on whether a predetermined target is present in the risk area and a registration of the risk area. The risk area information includes coordinate information of the four vertexes that define the risk area identified in S802. The risk area information may include geographical coordinate information expressed by longitudes and latitudes of the four vertexes defining the risk area. The risk area information may include information representing a current location of the vehicle 20 or a traveling direction of the vehicle 20.

When the server 52 receives the risk area information transmitted from the vehicle 20, in S812, the retention control unit 310 registers the coordinate information of the vertexes received through the risk area information as vertex information of the risk area. For example, the retention control unit 310 causes the storage unit 380 to store the coordinate information of the vertexes received in S808 as the vertex information of the risk area.

In S813, the determination unit 320 determines whether the terminal 82 is present in an area defined by the four vertexes included in the risk area information received from the vehicle 20. For example, in the situation shown in FIG. 1, the determination unit 320 determines that the terminal 82 is not present in the area 110 defined by the four vertexes included in the risk area information. In this case, the transmission control unit 350 does not need to cause response information with respect to the risk area information to be transmitted to the vehicle 20. It is to be noted that when the terminal 82 is not present in the area defined by the four vertexes included in the risk area information, the transmission control unit 250 may cause response information notifying that a target is not present in the risk area to be transmitted to the vehicle 20.

After that, in S822, the information processing apparatus 64 of the vehicle 60 transmits a risk area request that requests location information of the risk area to the server 52. The risk area request may include information representing a position of the vehicle 60 and a traveling direction of the vehicle 60. In S814, the transmission control unit 350 causes, based on the risk area request, vertex information of a risk area present up ahead in the traveling direction of the vehicle 60 out of the vertex information of the risk areas stored in the storage unit 380 to be transmitted to the vehicle 60.

In S824, when determined that the vehicle 60 has approached the position represented by the vertex information based on the current location of the vehicle 60 and the vertex information received from the server 52, the information processing apparatus 64 sets a risk area based on coordinate information of the vertexes represented by the vertex information and the vehicle speed of the vehicle 60. For example, as described in relation to FIG. 3, the information processing apparatus 64 determines the vertex 123 and the vertex 124 based on the coordinates of the two vertexes 111 and 112 and the distance L2, and sets the area 120 defined by the vertex 111, the vertex 112, the vertex 113, and the vertex 114 as the risk area. In S825, the information processing apparatus 64 transmits, to the server 52, risk area information including the four vertexes of the risk area set in S824 as risk area information for inquiring whether a predetermined target is present in the risk area.

When the server 52 receives the risk area information transmitted from the vehicle 60, in S815, the determination unit 320 determines whether the terminal 82 is present in the area defined by the four vertexes included in the risk area information received from the vehicle 60. For example, in the situation shown in FIG. 3, the determination unit 320 determines that the terminal 82 is present in the area 120 defined by the four vertexes included in the inquiry information. In this case, in S816, the transmission control unit 350 causes warning information notifying that the terminal 82 is present in the area to be transmitted to the vehicle 60 as response information with respect to the risk area information via the communication apparatus 348. Further, the transmission control unit 350 causes warning information notifying that the vehicle is approaching to be transmitted to the terminal 82 via the communication apparatus 348.

Upon receiving the warning information from the server 52, in S828, the information processing apparatus 64 outputs a warning with respect to the passenger of the vehicle 60 using the HMI function of the information output apparatus 40. Further, upon receiving the warning information from the server 52, in S838, the terminal 82 outputs a warning with respect to the person 80 using the HMI function of the terminal 82.

As described above, according to the information processing apparatus 24, since the risk area can be determined so as not to generally include the sidewalk 71, a situation where a person walking on a sidewalk or a vehicle is warned can be prevented from occurring. Therefore, the range of the risk area can be set to be within a highly convenient range, and the warning can be notified efficiently.

It is to be noted that for the communication between the information processing apparatus 24 and the server 52, a communication system conforming to Cellular-V2X may be adopted. Cellular-V2X includes communication systems such as LTE-V2X PC5 and 5G-V2X PC5. In another embodiment, for the communication between the information processing apparatus 24 and the server 52, a form that uses Wi-Fi (registered trademark) or DSRC (Dedicated Short Range Communications) may also be adopted. For the communication between the information processing apparatus 24 and the server 52, any communication system other than Cellular-V2X, DSRC (registered trademark), and the like, such as Bluetooth (registered trademark), may be adopted. The information processing apparatus 24 may communicate with the server 52 using a communication infrastructure of ITS (Intelligent Transport Systems).

It is to be noted that the vehicle 20 and the vehicle 60 are each an example of transportation equipment. The transportation equipment may include an automobile such as a passenger car and a bus, a saddle riding type vehicle, a bicycle, and the like. Moreover, although the system 10 functions as a system for performing warning when the terminal 82 is present in the risk area in the present embodiment described above, the system 10 may also function as a system for performing warning when any communication apparatus other than the terminal 82, whose location information can be managed by the server 52, is present. Such a communication apparatus may be provided in any moving object such as an automobile, a saddle riding type vehicle, and a bicycle.

As described above, the present embodiment has been made in view of the circumstances that warning is performed with respect to a person walking on a sidewalk or a vehicle, and the present embodiment aims at suppressing lowering of smoothness of traffic while improving traffic safety.

Figure 12:
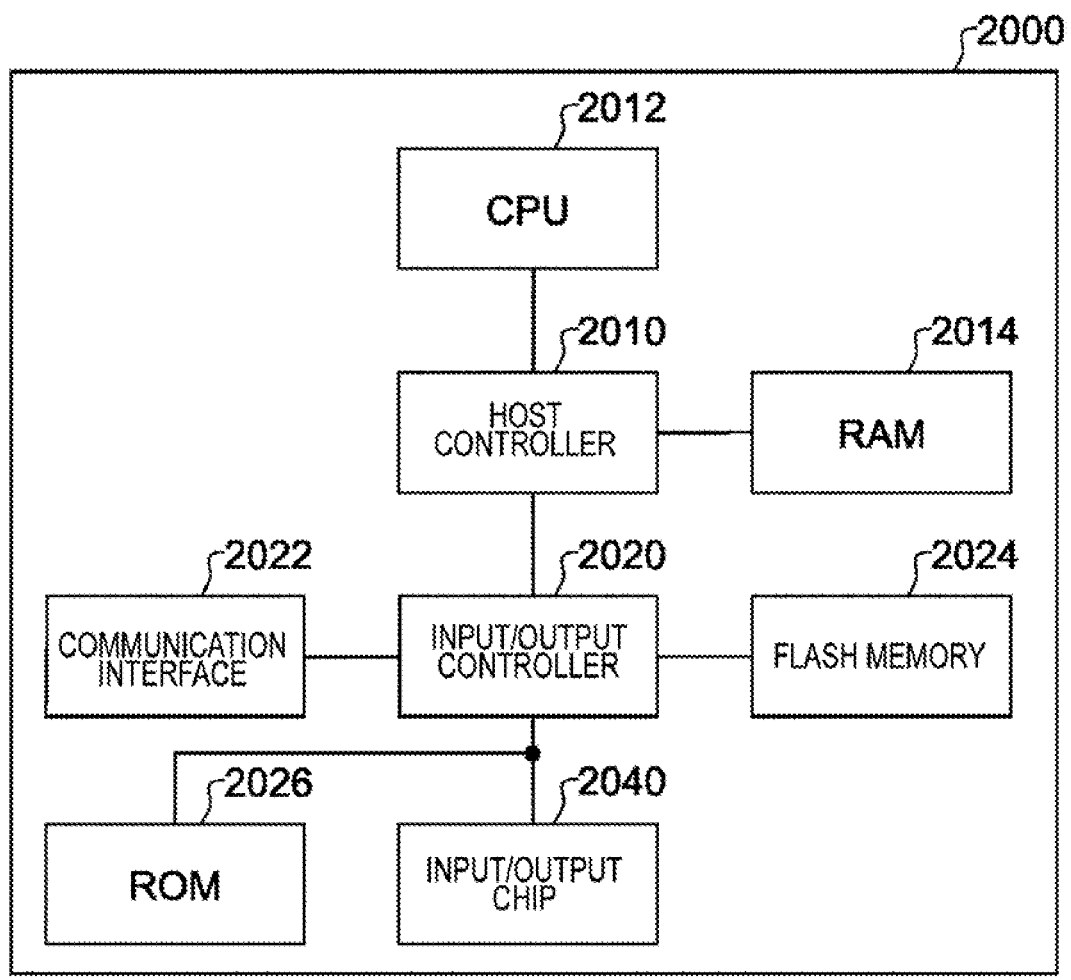
FIG. 12 illustrates an example of a computer 2000.

FIG. 12 illustrates an example of a computer 2000 in which a plurality of embodiments of the present invention may be entirely or partially embodied. Programs installed in the computer 2000 can cause the computer 2000 to function as an apparatus such as the information processing apparatus 24 according to the present embodiment or the respective units of the apparatus or function as a server such as the server 52 according to the present embodiment or the respective units of the server, or can cause the computer 2000 to execute operations associated with the apparatus, the respective units of the apparatus, the server, or the respective units of the server, and/or can cause the computer 2000 to execute a process according to the present embodiment or steps of the process. Such a program may be executed by a CPU 2012 in order to cause the computer 2000 to execute a specific operation associated with some or all of the blocks in the processing procedure and the block diagram described in the specification.

The computer 2000 according to the present embodiment includes the CPU 2012 and a RAM 2014, which are connected mutually by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the program stored in the ROM 2026 and the RAM 2014, thereby controlling each unit.

The communication interface 2022 communicates with other electronic devices via a network. The flash memory 2024 stores the program and data used by the CPU 2012 in the computer 2000. The ROM 2026 stores a boot program or the like executed by the computer 2000 during activation, and/or a program depending on hardware of the computer 2000. The input/output chip 2040 may also connect, to the input/output controller 2020, various input/output units such as a keyboard, a mouse, and a monitor via input/output ports such as a serial port, a parallel port, a keyboard port, a mouse port, a monitor port, a USB port, and an HDMI (registered trademark) port.

A program is provided via a computer-readable medium such as a CD-ROM, a DVD-ROM, or a memory card, or a network. The RAM 2014, the ROM 2026, or the flash memory 2024 is an example of the computer-readable medium. The program is installed in the flash memory 2024, the RAM 2014, or the ROM 2026 and executed by the CPU 2012. Information processing written in these programs is read by the computer 2000, thereby resulting in cooperation between the program and above-described various types of hardware resources. An apparatus or method may be constituted by realizing the operations or processing on information according to the use of the computer 2000.

For example, when communication is performed between the computer 2000 and external devices, the CPU 2012 may execute a communication program loaded in the RAM 2014, and instruct the communication interface 2022 to execute communication processing based on the processing written in the communication program. The communication interface 2022, under the control of the CPU 2012, reads out transmission data stored in a transmission buffer processing area provided in a recording medium such as the RAM 2014 and the flash memory 2024, transmits the read transmission data to the network, and writes reception data received from the network into a reception buffer processing area or the like provided on the recording medium.

Also, the CPU 2012 may cause all or required portions of a file or a database stored in the recording medium such as the flash memory 2024 to be read by the RAM 2014, and perform various types of processing on the data on the RAM 2014. The CPU 2012, then, writes back the processed data into the recording medium.

Various types of programs and various types of information such as data, tables, and databases may be stored in the recording medium and subjected to information processing. The CPU 2012 may perform, on the data read from the RAM 2014, various types of processing including various types of operations, information processing, conditional judgments, conditional branching, unconditional branching, information searching/replacing and the like described in the specification and specified by an instruction sequence of the program, and writes back the result into the RAM 2014. Also, the CPU 2012 may search for information in a file, a database, or the like in the recording medium. For example, when a plurality of entries each having an attribute value of a first attribute associated with an attribute value of a second attribute are stored in the recording medium, the CPU 2012 may search for an entry in which the attribute value of the first attribute is specified and that match with a condition from among the plurality of entries, read the attribute value of the second attribute stored in the entry, and thereby acquire the attribute value of the second attribute associated with the first attribute meeting a predetermined condition.

The program or software module described above may be stored in a computer-readable medium on the computer 2000 or near the computer 2000. A recording medium such as a hard disk or a RAM provided in a server system connected to a dedicated communication network or the Internet can be used as a computer-readable medium. The program stored in the computer-readable medium may be provided to the computer 2000 via the network.

When causing the computer 2000 to function as the control unit 200, a program that is installed in the computer 2000 and causes the computer 2000 to function as the control unit 200 may work on the CPU 2012 or the like to cause the computer 2000 to function as the respective units of the control unit 200. Information processing written in these programs functions as each unit of the control unit 200 that is specific means by which software and the above-described various hardware resources cooperate by being read by the computer 2000. Then, by the specific means realizing calculation or processing of information according to a purpose of use of the computer 2000 in the present embodiment, a unique control unit 200 corresponding to the purpose of use is constructed.

When causing the computer 2000 to function as the control unit 300, a program that is installed in the computer 2000 and causes the computer 2000 to function as the control unit 300 may work on the CPU 2012 or the like to cause the computer 2000 to function as the respective units of the control unit 300. Information processing written in these programs functions as each unit of the control unit 300 that is specific means by which software and the above-described various hardware resources cooperate by being read by the computer 2000. Then, by the specific means realizing calculation or processing of information according to a purpose of use of the computer 2000 in the present embodiment, the unique control unit 300 according to the purpose of use is constructed.

The various embodiments have been described with reference to the block diagrams and the like. In the block diagrams, each block may represent (1) a step of a process in which an operation is performed, or (2) each unit of the apparatus having a role of performing the operation. Certain steps and each unit may be implemented by a dedicated circuit, a programmable circuit supplied with computer-readable instructions stored on the computer-readable medium, and/or processors supplied with computer-readable instructions stored on the computer-readable medium. The dedicated circuit may include a digital and/or analog hardware circuit, or may include an integrated circuit (IC) and/or a discrete circuit. The programmable circuit may include a reconfigurable hardware circuit including: logical AND, logical OR, exclusive OR (XOR), negative AND (NAND), negative OR (NOR), and other logical operations; and a memory element such as a flip-flop, a register, a field programmable gate array (FPGA), a programmable logic array (PLA); and so on.

A computer-readable medium may include any tangible device that can store instructions to be executed by a suitable device, and as a result, the computer-readable medium having the instructions stored thereon constitutes at least a part of an article of manufacture including instructions which can be executed to create means for performing operations specified in the processing procedures or block diagrams. Examples of the computer-readable medium may include an electronic storage medium, a magnetic storage medium, an optical storage medium, an electromagnetic storage medium, a semiconductor storage medium, and the like. Specific examples of the computer-readable medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a portable compact disc read-only memory (CD-ROM), a digital versatile disc (DVD), a Blu-ray (registered trademark) disc, a memory stick, an integrated circuit card, or the like.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

Computer-readable instructions may be provided to a general-purpose computer, a special-purpose computer, or a processor or a programmable circuit of other programmable data processing apparatuses, locally or via a local area network (LAN) or a wide area network (WAN) such as the internet, and the computer-readable instructions may be executed in order to result in means for executing operations specified by the described processing procedures or block diagrams. Examples of the processor include a computer processor, a processing unit, a microprocessor, a digital signal processor, a controller, a microcontroller, and the like.

While the embodiments of the present invention have been described, the technical scope of the present invention is not limited to the above-described embodiments. It is apparent to persons skilled in the art that various alterations or improvements can be made to the above-described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system;
20, 60, 90: vehicle;
21: radar;
22: camera;
24: information processing apparatus;
25: GNSS reception unit;
26: vehicle speed sensor;
29: sensor;
40: information output apparatus;
48: communication apparatus;
50: base station;
52: server;
64: information processing apparatus;
70: roadway;
71, 72: sidewalk;
80: person;
82: terminal;
110, 120: area;
111, 112, 113, 114, 123, 124: vertex;
200: control unit;
208: control unit;
210: coordinate information acquisition unit;
220: risk area identification unit;
230: curve information identification unit;
250: transmission control unit;
260: reception control unit;
280: storage unit;
300: control unit;
310: retention control unit;
320: determination unit;
348: communication apparatus;
350: transmission control unit;
360: reception control unit;
380: storage unit;
401, 403, 501, 503, 601, 603, 701, 703: position;
410, 510, 610, 710, 810: area;
411, 412, 413, 414: vertex;
511, 512, 513, 514: vertex;
650, 750: boundary;
611, 612, 613, 714: vertex;
711, 712, 713, 714: vertex;
2000: computer;
2010: host controller;
2012: CPU;
2014: RAM;
2020: input/output controller;
2022: communication interface;
2024: flash memory;
2026: ROM;
2040: input/output chip.

What is claimed is:

1. An information processing apparatus comprising:
at least one processor;
a risk area identification unit configured to, using the at least one processor, identify a risk area at an outside of a moving object and at an outside of a predetermined first area in which the moving object is prohibited from moving, the risk area surrounding another object that blocks a view from the moving object; and
a transmission control unit configured to, using the at least one processor, perform control for transmitting risk area information representing the risk area identified by the risk area identification unit to a server configured to retain information related to the risk area,
wherein
the risk area identification unit is configured to, using the at least one processor, identify, as the risk area, an area defined by a plurality of points that surround the other object, and
the risk area identification unit is configured to, using the at least one processor, identify, based on a boundary between the first area and a predetermined second area, which is in contact with the first area and in which the moving object is allowed to move, a shape of the risk area on a side of the boundary.

2. The information processing apparatus according to claim 1, wherein
the risk area identification unit is further configured to, using the at least one processor, identify the shape of the risk area by a polygon having at least one point on the boundary as a vertex.

3. The information processing apparatus according to claim 2, wherein
the risk area identification unit is further configured to, using the at least one processor:
set the vertex on a side of the moving object; and identify the shape of the risk area by a straight line extending, from the vertex, substantially parallel to a moving direction of the moving object.

4. The information processing apparatus according to claim 1, wherein
the risk area identification unit is further configured to, using the at least one processor, identify the shape of the risk area on the side of the first area boundary by a tangent of the boundary.

5. The information processing apparatus according to claim 1, wherein
the risk area identification unit is further configured to, using the at least one processor:
set a first point farthest from the first area and a second point closest to the moving object;
identify the shape of the risk area on an opposite side of the boundary by a line which passes through the first point and is parallel to a moving direction of the moving object; and
identify the shape of the risk area on a side of the moving object by a line which passes through the second point and is substantially orthogonal to the moving direction of the moving object.

6. The information processing apparatus according to claim 1, comprising:
a curve information identification unit configured to, using the at least one processor, identify a curve direction of the boundary up ahead in a moving direction of the moving object,
wherein the risk area identification unit is further configured to, using the at least one processor, identify the shape of the risk area on the side of the boundary by a tangent of the boundary when the boundary is directed in a direction toward a side of the first area with respect to the moving direction of the moving object based on the curve direction of the boundary.

7. The information processing apparatus according to claim 1, comprising:
a curve information identification unit configured to identify, using the at least one processor, a curve direction of the boundary up ahead in a moving direction of the moving object,
wherein the risk area identification unit is further configured to, using the at least one processor, identify the shape of the risk area on the side of the boundary by a line extending along the boundary when the boundary is directed in a direction toward an opposite side of a side of the first area with respect to the moving direction of the moving object based on the curve direction of the boundary.

8. The information processing apparatus according to claim 1, wherein
the risk area identification unit is further configured to, using the at least one processor, identify a length of the risk area in a direction along a moving direction of the moving object according to a speed of the moving object.

9. The information processing apparatus according to claim 1, wherein
the risk area identification unit is further configured to, using the at least one processor, identify such that the risk area becomes longer in a direction along a moving direction of the moving object as a speed of the moving object becomes higher.

10. The information processing apparatus according to claim 1, wherein
the moving object is a vehicle.

11. The information processing apparatus according to claim 10, wherein
the first area is a sidewalk, and the second area is a roadway.

12. The information processing apparatus according to claim 1, wherein
the information processing apparatus is mounted on the moving object.

13. The information processing apparatus according to claim 1, wherein
the server is a mobile edge computing (MEC) server.

14. The information processing apparatus according to claim 4, further comprising:
a curve information identification unit configured to, using the at least one processor, identify a curve direction of the boundary up ahead in a moving direction of the moving object,
wherein the risk area identification unit is further configured to, using the at least one processor, identify the shape of the risk area on the side of the boundary by the tangent of the boundary when the boundary is directed in a direction toward a side of the first area with respect to the moving direction of the moving object based on the curve direction of the boundary.

15. The information processing apparatus according to claim 4, comprising:
a curve information identification unit configured to identify, using the at least one processor, a curve direction of the boundary up ahead in a moving direction of the moving object,
wherein, the risk area identification unit is further configured to, using the at least one processor, identify the shape of the risk area on the side of the boundary by a line extending along the boundary when the boundary is directed in a direction toward an opposite side of a side of the first area with respect to the moving direction of the moving object based on the curve direction of the boundary.

16. The information processing apparatus according to claim 2, wherein
the risk area identification unit is further configured to, using the at least one processor, identify a length of the risk area in a direction along a moving direction of the moving object according to a speed of the moving object.

17. A moving object comprising the information processing apparatus according to claim 1.

18. A system comprising:
the moving object according to claim 17; and
the server.

19. An information processing method comprising:
identifying a risk area at an outside of a moving object and at an outside of a predetermined first area in which the moving object is prohibited from moving, the risk area surrounding another object that blocks a view from the moving object; and
performing control for transmitting risk area information representing the risk area that has been identified to a server configured to retain information related to the risk area,
wherein
the identifying of the risk area includes identifying, as the risk area, an area defined by a plurality of points that surround the other object, and
the identifying of the risk area includes identifying, based on a boundary between the first area and a predetermined second area, which is in contact with the first area and in which the moving object is allowed to move, a shape of the risk area on a side of the boundary.

20. A non-transitory computer-readable storage medium having stored thereon a program for causing a computer to function as:
a risk area identification unit configured to identify a risk area at an outside of a moving object and at an outside of a predetermined first area in which the moving object is prohibited from moving, the risk area surrounding another object that blocks a view from the moving object; and
a transmission control unit configured to perform control for transmitting risk area information representing the risk area identified by the risk area identification unit to a server configured to retain information related to the risk area,
wherein
the risk area identification unit is configured to identify, as the risk area, an area defined by a plurality of points that surround the other object, and
the risk area identification unit is configured to identify, based on a boundary between the first area and a predetermined second area, which is in contact with the first area and in which the moving object is allowed to move, a shape of the risk area on a side of the boundary.

* * * * *